United States Patent [19]
Morrison

[11] 3,843,887
[45] Oct. 22, 1974

[54] SELF CALIBRATING ISOTOPIC PRECIPITATION MEASUREMENT GAGE

[76] Inventor: Roderick Gordon Morrison, 3440 N. 33rd St., Boise, Idaho 83703

[22] Filed: May 22, 1972

[21] Appl. No.: 229,266

[52] U.S. Cl. .............................................. 250/358
[51] Int. Cl. ............................................ G01t 1/16
[58] Field of Search..... 250/43.5 D, 83.3 D, 83.6 R, 250/83.6 FT, 357, 358

[56] References Cited
UNITED STATES PATENTS
3,432,656  3/1969  Smith et al..................... 250/83.3 D
3,657,532  4/1972  Zimmerman.................... 250/43.5 D OTHER PUBLICATIONS
"Telemetering System," Electronics, Doremus, Feb. 1951, pp. 88–91.

"Telemetering Broadens Gaging and Monitoring," Nucleonics, April, 1960, p. 106.

Primary Examiner—James W. Lawrence
Assistant Examiner—Davis L. Willis
Attorney, Agent, or Firm—Clarence A. O'Brien; Harvey B. Jacobson

[57] ABSTRACT

An isotopic source emitting highly energetic gamma rays transmitted through attenuating materials to a given point at which energy discriminating detectors are located and an electronic circuit connected to the detectors to establish a continuously calibrated density measurement from which the water content in a snow field is determined.

9 Claims, 3 Drawing Figures

SELF CALIBRATING ISOTOPIC PRECIPITATION MEASUREMENT GAGE

This invention relates to measurement of total precipitation above and below ground level in a snow field by observing the attenuation of gamma rays being emitted from a radioisotope.

In the density measuring art, it was early recognized that the characteristics of penetrating electromagnetic radiations from isotopic sources is attenuated according to an exponential decay pattern which followed the predictible mathematical relationship of $e^{upt}$, where e is the natural logarithm, $u$ is correlatable to the gamma absorption coefficient of the media through which the gamma ray is penetrating, $p$ is the density of the media through which the gamma ray is penetrating, and $t$ is the distance through which the gamma ray is penetrating. This relationship has led to the development of numerous devices capable of measuring precisely the density of substances, which is in turn correlatable to liquid level, material thicknesses, and numerous other situations for which a variable parameter can be established in which two of the three factors in the $e^{upt}$ relationship are known. However such systems have not proved effective in long term usage because of the decaying characteristics of the isotopic source in situations where deep penetration of the measured parameter is required, or where characteristics of the receiving network must discriminate against scattered radiations, or where the ambient temperature of the media and detection network varies over a large range.

Radiations emanating from the source with a distinct energy, such as Cesium-137 with a monoenergetic gamma ray of 661 Kev, can be received by a detector such as a sodiumiodide crystal and a light sensitive diode, commonly referred to as a scintillation detector. The gamma pulse received will cause a rapid electrical count to be generated. The number of counts thus received are related to the number of photons, and are correlatable to the distance from the source, the density of the media through which radiation is traveling, or the attenuation coefficient of the material through which the gamma rays are penetrating. Since the detection network is sensitive to many energies of the received radiations, that is energies other than 661 Kev, steps are taken to place discriminating apparatus around the detection network such that all unwanted energies are eliminated, i.e., those above or below the desired energy level. Such techniques are referred to as window or threshold discriminators and are designed to reduce scattering. Scattering is the slowing down of radiations by elastic or inelastic collisions with the atoms of the media through which the gamma rays are traveling. Each scatter tends to reduce the energy of the gamma ray, i.e., a 661 Kev gamma ray will eventually come to equilibrium after it has collided with or annihilated atoms in its path. In the above mentioned technique of recording, the arrival of a distinct gamma energy, is sometimes in doubt. It is difficult to receive only the desired gamma ray energy since the scattered gamma rays that have not been degraded too far in energy will arrive at the detector over some oblique path not representative of the important and controlling measurement parameter t, which is the distance between the source and detector. To overcome this unwanted occurence, photo peak detection schemes are used which attempt to record only the discrete signature of a specific energy such as 661 Kev. Such methods provide an accurate measurement of measuring density or thickness of a given material provided a precise knowledge of the source strength and the temperature of the receiving crystal and electronic circuits are held within narrow limits and are known. Crystals such as cesium-iodide are employed in lower temperature extremes, however their efficiencies are not as great, and thus to obtain statistical accuracy, long counting periods or high strength sources are required. In addition, for precision work, to compensate for source decay and temperature variations, a reference count must be established whereby a media of known absorption, density, and distance is available and this then is compared with the measurement count.

In addition to more sophisticated attenuation measuring techniques, such as that described above, more simple methods utilizing Geiger-Mueller tubes and isotopic sources are employed where the scattered radiations do not play a significant role in the detection network. Such systems are limited to relatively low density materials in which the source emits lower energy gamma rays, and the source has a relatively long life time such that the decay of the source can be predicted within the accuracy limitations required by the measurement. Such systems are in use as fuel gages where the penetration distance can be held to a relatively low value, and the detection network measures all events regardless of the predominant energy emitted by the source.

It is the particular object of this present invention to provide an arrangement whereby the highly energetic sources, such as Cobalt-60, a duoenergetic gamma emitter of 1.17 and 1.32 Mev, with a capability of penetrating through great distances of dense materials, such as water, can be used to measure density over large distances. Since the beforementioned scattering problem increases with the increased energetics of the source, the system must be so arranged such that nearly all but the desired unscattered radiations are eliminated from the density computation. Further, since a source of Cobalt-60 has a relatively short half-life of 5.25 years, for long term usage the system must have a source strength compensation scheme whereby the actual emissive strength of the source can be monitored and factored into the density computation.

In brief, arrangements in accordance with this invention include a gamma source, a metalic set of attenuation plates whose three parameters of thickness, density, and attenuation coefficients are known, and a receiving network of known discriminating characteristics. These components are so arranged geometrically to achieve an absolute density measurement over long periods of time.

The method of accomplishing this is to construct a shield of very dense material such as lead or depleted uranium in which two or more holes are drilled such that a narrow beam of radiation is allowed to escape from the emplaced source at an established angle from the sphereical center of the source. At a fixed distance from the source, an energy discriminating detector is placed which records the number of gamma rays arriving over this fixed distance. Hereafter, this detector is referred to as the measurement detector. Another detector hereafter referred to as the reference detector, of similar energy discriminating characteristics is placed a fixed distance from the source in the narrow beam of radiation escaping from the source through the second hole in the shield. The path for the escaping gamma rays is constructed such that in addition to a fixed distance, this reference detector has a fixed media, such as air, through which the gamma rays travel and the only parameter changing between the source and reference detector is the number of gamma rays emmanating from the source. The source to measurement detector and source to reference detector parameters are arranged such that the pulses recorded from the two detectors looking at the source are very nearly the same numerically even though distances are different. This is accomplished by placing a metalic disc in between the reference detector and source. The thickness of this disc is trimmed to establish a count rate at the reference detector which is nearly the same as that received by the measurement detector. An electronic counting network is then established which simultaneously counts the number of gamma rays arriving at the measurement detector and the reference detector. An electronic gate is used to simultaneously open the two described counting networks to assure that both detectors are counting simultaneously. The two counting networks, referred to in the electronic art as scalers, have the ability to count at the same rate. The reference scaler is pre-set to stop counting when a specific number of events have been recorded. The measurement scaler is not pre-set but is so constructed that when the reference scaler has achieved its pre-set value, the measurement scaler is then stopped by the reference scaler. At this point, if no change has occurred in the region between the source and the measurement detector, the scaler value of counts at the reference and measurement circuits are nearly equal. The ratio of the measurement detector and the reference detector count value is therefore unity. By comparing the scaler values as a ratio, the output of these circuits will always be one, regardless of the strength of the source. This, therefore eliminates any concern regarding the decaying characteristics of the source.

If any material is then brought between the source and the measurement detector, the number of events recorded by the measurement scaler will diminish according to the beforementioned relationship $e^{upt}$ and the ratio established by the two networks will be a number less than one. Since the measurement parameter $t$ is fixed, and the material whose density is to be determined is constant with regard to $u$, the variable being established by the ratio is directly correlated to $p$ or the density of the region between the source and the measurement detector. This, therefore establishes a measurement of density regardless of the decaying characteristics of the source.

A better understanding of this invention can be had by referring to the drawing in which FIG. 1 is a schematic side elevation view of apparatus constructed in accordance with the invention, with parts broken away and shown in section.

Figure 1:
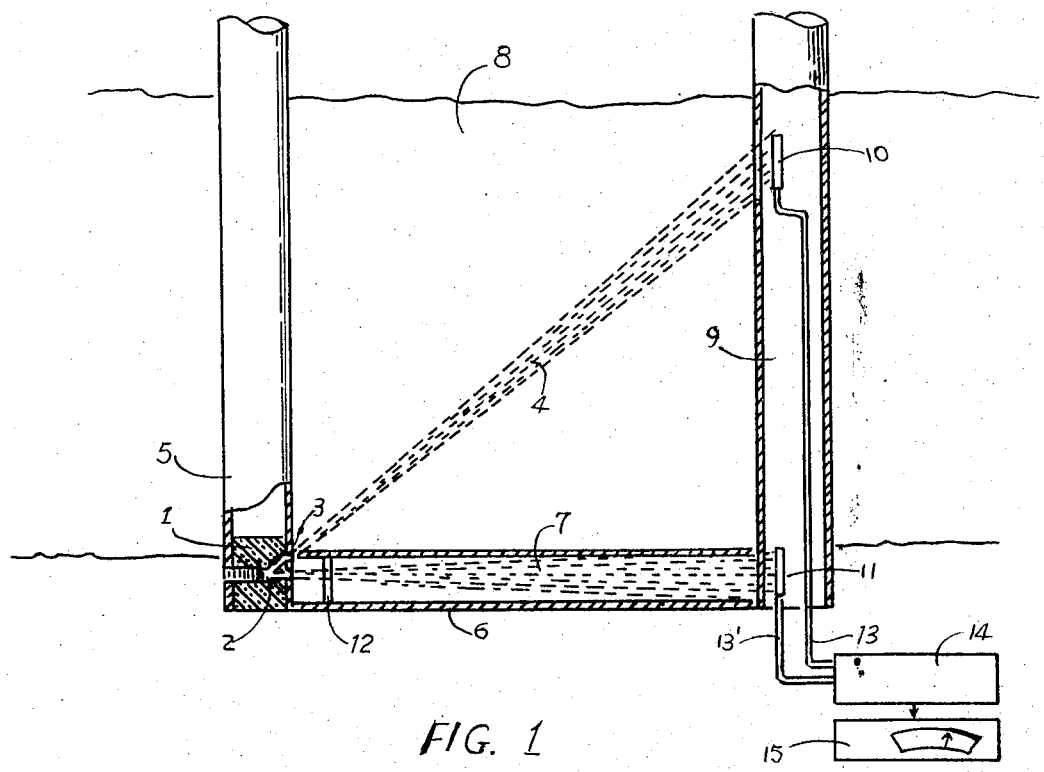

With reference to FIG. 1, a highly dense material 1 is so constructed as to form a place for a highly energetic source 2 which is so placed that two finely collimated beams of radiation (4 and 7) are allowed to escape. These radiations are respectively detected by a measurement detector 10 and a reference detector 11. The reference detector has a tube 6 so constructed that the region 7 between the source 2 and the detector 11 will remain constant regarding characteristics of gamma attenuation and density. Such a media in most practical embodiments will be air. Since the distance between the source 2 and the measurement detector 10 will always be greater than the distance between the source 2 and the reference detector 11, a metallic disc 12 is placed in between the source 2 and the reference detector 11. This disc 12 is trimmed mechanically to a thickness dimension such that the counts reaching detectors 10 and 11 will be nearly equal. Mechanical devices, 5, 9 and 6, such as pipe are used to position the apparatus in a fixed geometry such that the dimensions between the source 2 and the measurement detector 10 are established and known.

The pulses received at the measurement detector 10 and the reference detector 11 are then carried by signal cables (13) (13') to an electronic circuit 14 which process the data to present a measure of density to a readout device 15.

As a more dense material, such as water 8 snow, or ice is brought in the measurement zone through which path between the source 2 and the measurement detector 10 extends the number of counts received by the measurement detector 10 will be reduced by the known exponential relationship $e^{upt}$. Since $u$ and $t$ are constant and known, the only variable is $p$ or the density of the substance coming in between the source 2 and detector 10. Since the reference detector 11 is receiving a constant exposure to the source 2 its received counts will be constant with respect to the source 2 at the start of the density measurement, while the counts received by the measurement detector 10 will diminish with respect to the varying density being introduced 8. The ratio of the number of counts received by the measurement detector 10 and the reference detector 11 therefore change according to the beforementioned exponential relationship.

Figure 2:
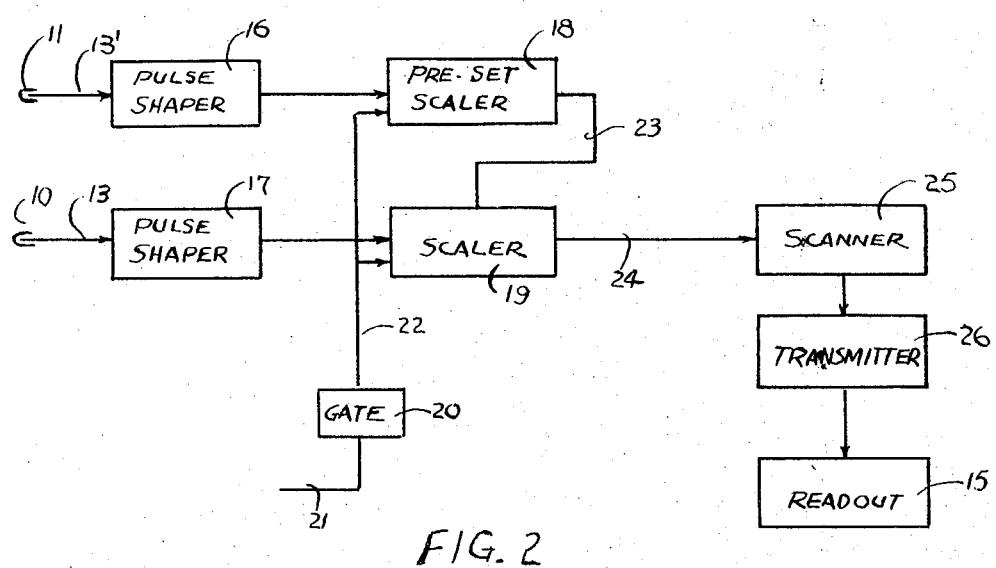
FIG. 2 is a block diagram of the control system associated with the invention.

The method of obtaining the constant calibration of the system can be better understood by referring to FIG. 2.

The pulses received by the reference detector 11 are shaped by an electronic circuit 16 such that they can be counted easily by a pre-set scaler 18. The pulses received by the measurement detector 10 are likewise shaped by an electronic network 17 to be counted easily by a measurement scaler 19. The reference scaler is set to receive a number of counts of sufficient magnitude to establish a statistical probability that most of the received pulses are from the desired unscattered gamma rays. The method of determining this will be further described under the characteristics of the detector. An electronic gate 20 is programmed such that when a command is received on a signal cable 21 the gate 20 opens the reference pre-set scaler 18 and the measurement scaler 19 simultaneously by means of signal cable 22. After the reference pre-set scaler 18 has received the desired number of counts, it transmits a stop signal 23 to the measurement scaler 19. Since the reference scaler 18 is set for a specific number of events, the decaying source strength will be compensated for because the reference scaler 18 will gradually be counting for a longer period of time. Since the reference scaler 18 provides the stopping circuit for the measurement scaler 19 both scalers will always be counting for the same length of time.

The reference scaler 18 will continue to count until the desired number of events required to obtain the desired statistics are received, and consequently the number of events counted by the measurement scaler 19 will establish the density of the material 8 between the source 2 and the measurement detector 10.

The number of counts received at the measurement scaler are then transferred to a scanner 25 and converted to a suitable voltage value which is then transmitted over a cable to a transmitter 26 which presents the value to a readout device 15. This is in a digital format, suitable for radio transmission, or can be converted to actuate a visual display such as a meter.

The detector used for this invention is Geiger-Mueller tube which is most efficient to highly energetic gamma rays. As opposed to conventional Geiger-Meuller tubes, it has the cathode coated with a layer of a highly dense material. This material makes the tube highly discriminatory to highly energetic gamma rays. At 1.2 Mev, the efficiency of the tube is greater than 1.5 percent. As the energy of the gamma rays decrease, so does the efficiency of the detector. At 661 Kev the tube is approximately 0.75 percent efficient, and at 100 Kev, the efficiency is approximately 0.1 percent. This then establishes the discrimination characteristics of the detector. By establishing a sufficient number of counts to be received in the pre-set scaler 18, only the first three significant numbers need be carried from the measurement scaler 19 for the measurement of density.

Figure 3:
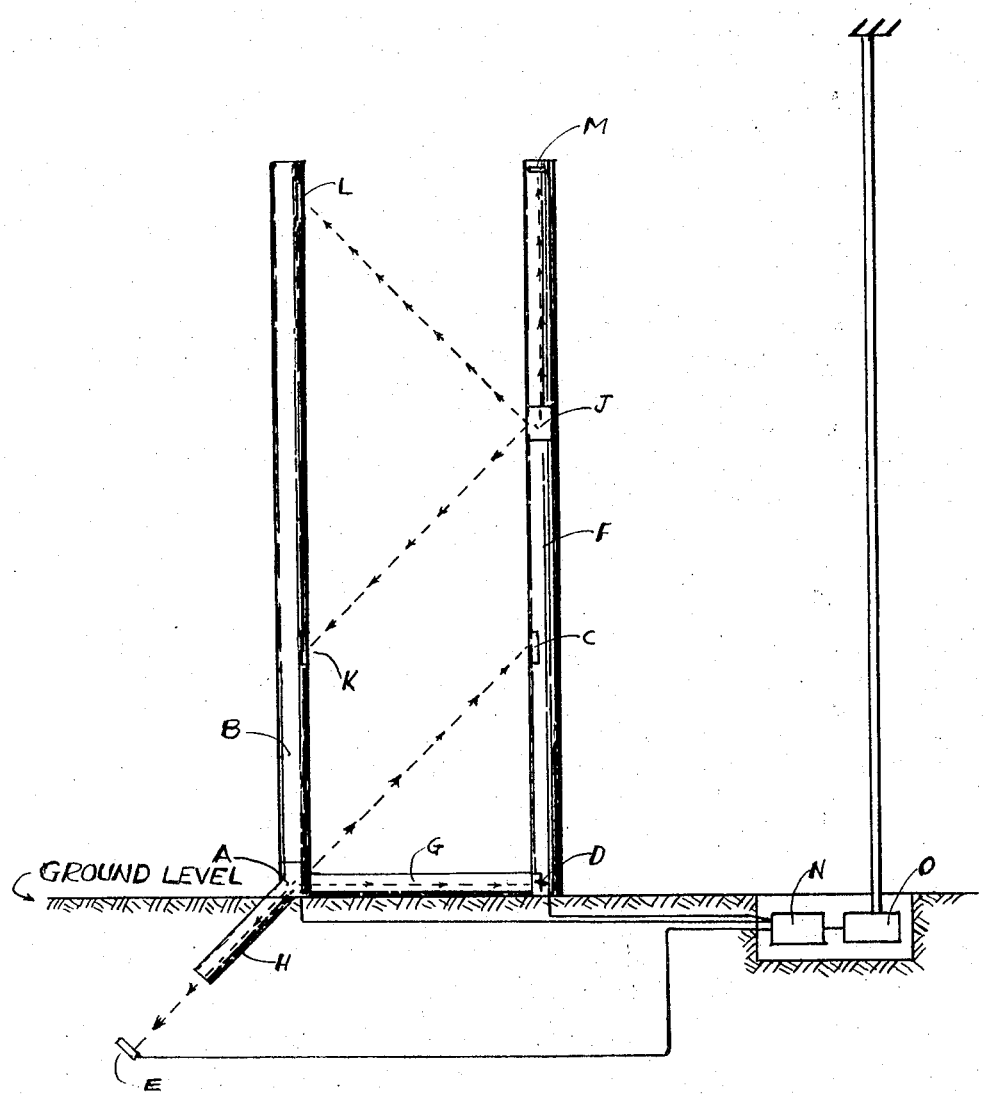
FIG. 3 is a schematic side elevation view of another installational embodiment of the invention.

A practical embodiment of this invention is illustrated in FIG. 3. In this configuration a measure of water content in a snow field is obtained while at the same time a change in water content of the soil underneath the ground surface is obtained. In this application a source and collimated shield A are housed in a standpipe B such that the assembly A is at the approximate surface of the ground. The source has three collimated paths looking at a measurement detector C mounted in another standpipe F a fixed angle and distance away from the source. A reference detector D is placed in the second standpipe with a tube G providing an air path between the source and reference detector D. A third measurement detector E is placed below the ground level a fixed angle and distance with respect to the source. A tube H sealed so as to maintain air is placed along the angle between the source and below ground detector to establish a desired below ground region for observation of density changes in the soil as a function of surface water penetration. As snow accumulates above the ground level between the source assembly A and the measurement detector C a measure of the water equivelent in the snow pack can be obtained by establishment of basic trigonometric relationships with respect to the fixed dimensions of the array. As the snow melts, a measure of water percolating through a given subsurface zone of soil can be obtained by the change in density of the soil.

As the depth of the snowfield increases another set of measurements can be obtained by adding a second collimated source assembly J with three radiation beams looking at a lower measurement detector K on a level coincident but opposite from measurement detector C, an upper measurement detector L and a reference detector M inside the standpipe. This sequence can be repeated up the standpipes as many times as desired to measure snowfield water content. The signals received by the detectors are routed to the electronic circuit N and the measurement information then multiplexed through conventional means to a transmitter O.

The density detector described herein utilizes fundamentals different from normal isotopic density gages in that it employs predominately highly energetic sources with relatively short half-lives in a manner such that the decaying strength of the source is automatically removed as a variable, while utilizing the greater depth penetrating ability of the highly energetic radioisotopes. It further utilizes a single compensated source for several measurements by proper placement of the source with a collimated shield. It further removes previous obstacles encountered in such devices in widely changing temperature environments by use of detectors and electronic components whose simplicity and characteristics enable performance in hostile environments.

It is apparent that many variations in the application of the teachings of this invention are possible. It is to be understood therefore that the forms of application of the invention herein shown and described are to be regarded as illustrative of the invention only and not as restricting the claims.

I claim:

1. In a system for measuring accumulation of atmospheric precipitation in a measurement zone by transmission of radiation from a radioactive source of energy through the measurement zone and detection of said transmitted radiation by measurement and reference detectors producing output pulses at rates dependent on the energy level of the detected radiation; the improvement comprising a body of radiation transmitting medium of constant density, means for mounting said detectors in fixed spaced relation to the source, shield means for directing radiation from said source along separate collimated beams extending respectively through the accumulated precipitation and constant density medium to said detectors, attenuation means mounted in said body of constant density medium for establishing a reference ratio of pulse rates between the output pulses of the detectors, and means for registering the output pulses of the measurement detector during a period determined by a fixed number of output pulses from the reference detector; whereby the number of output pulses registered during said period is a function of the density of the accumulated precipitation in the measurement zone.

2. The system of claim 1, wherein said mounting means includes a pair of vertical pipes between which the measurement zone is defined, said detectors being positioned in vertically spaced relation within at least one of the pipes, the source being positioned in the other of the pipes.

3. The system of claim 2 including a tubular member enclosing said body of constant density medium and extending between said pipes to establish a path for one of the collimated beams between the source and the reference detector at an angle to the other of the collimated beams in the measurement zone.

4. The system of claim 3 wherein said shield means includes a block of dense material enclosing a cavity within which the source is positioned and passages extending therefrom at said angle between the collimated beams.

5. The system of claim 4 including digital readout means connected to the output pulse registering means.

6. The system of claim 5 including an additional source of radiation positioned in one of the pipes and additional detectors connected to the digital readout means receiving radiation through the measurement zone from said additional source.

7. The system of claim 6 wherein said variable density media includes atmospheric precipitation.

8. The system of claim 1 wherein said precipitation is accumulated in subsurface soil.

9. The system of claim 3 including means for directing radiation from the source at said angle through a second measurement zone containing a medium more dense than the accumulated precipitation and an additional measurement detector positioned in said second measurement zone for receiving said directed radiation from the source.

* * * * *